United States Patent
Anantha et al.

(10) Patent No.: US 9,627,840 B2
(45) Date of Patent: Apr. 18, 2017

(54) METAMATERIAL STRUCTURES FOR Q-SWITCHING IN LASERS

(71) Applicant: Indian Institute of Technology, Kanpur (IN)

(72) Inventors: Ramakrishna Subramaniam Anantha, Kanpur (IN); Govind Dayal Singh, Kanpur (IN)

(73) Assignee: INDIAN INSTITUTE OF TECHNOLOGY KANPUR, Kanpur (IN)

( * ) Notice: Subject to any disclaimer, the term of this patent is extended or adjusted under 35 U.S.C. 154(b) by 421 days.

(21) Appl. No.: 14/131,899

(22) PCT Filed: Apr. 17, 2013

(86) PCT No.: PCT/IB2013/053032
§ 371 (c)(1),
(2) Date: Jan. 9, 2014

(87) PCT Pub. No.: WO2014/087256
PCT Pub. Date: Jun. 12, 2014

(65) Prior Publication Data
US 2014/0355639 A1    Dec. 4, 2014

(30) Foreign Application Priority Data
Dec. 3, 2012 (IN) .......................... 3706/DEL/2012

(51) Int. Cl.
*H01S 3/08* (2006.01)
*G02B 1/00* (2006.01)
(Continued)

(52) U.S. Cl.
CPC .......... *H01S 3/08059* (2013.01); *G02B 1/002* (2013.01); *H01S 3/11* (2013.01);
(Continued)

(58) Field of Classification Search
CPC ........ H01S 3/08059; H01S 3/11; H01S 3/113; G02B 1/002; G02B 1/13; G02F 1/17
See application file for complete search history.

(56) References Cited

U.S. PATENT DOCUMENTS 3,831,165 A * 8/1974 Chivian ................. B23K 26/18
                                                       345/106
4,283,113 A * 8/1981 Eden ........................ G02F 1/19
                                                        356/28.5
(Continued)

FOREIGN PATENT DOCUMENTS

WO        2011035230 A2    3/2011

OTHER PUBLICATIONS

International Search Report and Written Opinion for PCT/IB2013/053032, Filed Apr. 17, 2013, mailed on Aug. 30, 2013.
(Continued)

*Primary Examiner* — Ryan Lepisto
*Assistant Examiner* — Erin Chiem
(74) *Attorney, Agent, or Firm* — Turk IP Law, LLC

(57) ABSTRACT

Techniques described herein are generally related to metamaterial structures for Q-switching in laser systems. The various described techniques may be applied to methods, systems, devices or combinations thereof. Some described metamaterial structures may include a substrate and a first conductive layer disposed on a first surface of the substrate. A dielectric layer may be disposed on a first surface of the first conductive layer and a second conductive layer having a substantially symmetric geometric shape may be disposed on a first surface of the dielectric layer. The second conductive layer may cover a portion of the first surface of the dielectric layer.

16 Claims, 3 Drawing Sheets

(51) Int. Cl.
*H01S 3/11* (2006.01)
*H01S 3/113* (2006.01)
*G02F 1/13* (2006.01)
*G02F 1/17* (2006.01)
*H01S 3/223* (2006.01)

(52) U.S. Cl.
CPC ............... *H01S 3/113* (2013.01); *G02F 1/13* (2013.01); *G02F 1/17* (2013.01); *H01S 3/2232* (2013.01); *Y10T 428/24752* (2015.01)

(56) References Cited

U.S. PATENT DOCUMENTS

| | | | |
|---|---|---|---|
| 5,748,663 A * | 5/1998 | Chenausky | H01S 3/0315 372/55 |
| 6,304,362 B1 | 10/2001 | Zheludev et al. | |
| 8,076,661 B2 | 12/2011 | McCarthy et al. | |
| 2002/0037421 A1* | 3/2002 | Arnaud | C03C 17/3417 428/472 |
| 2005/0087753 A1* | 4/2005 | D'Evelyn | C30B 9/00 257/98 |
| 2010/0303123 A1 | 12/2010 | Li | |
| 2014/0146382 A1 | 5/2014 | Cerny | |

OTHER PUBLICATIONS

Dayal et al., "Metamaterial Saturable Absorber Mirror", Optics Letters, vol. 38, Issue 3, pp. 272-274, Feb. 2013.
Dayal et al., "Design of highly absorbing metamaterials for Infrared frequencies", Optics Express, vol. 20, Issue 16, pp. 17503-17508, Jul. 2012.
Petropoulos et al., "Passive Q-switching of fiber lasers using a broadband liquefying gallium mirror", Applied Physics Letters, vol. 74, Issue 24, pp. 3619-3621, Jun. 1999.
Huang et al., "Optical switching of a metamaterial by temperature controlling", Applied Physics Letters, vol. 96, Jul. 2010.
Pollack et al., "Passive Q switching and mode-locking of Er: glass lasers using VO2 mirrors", Applied Physics, vol. 78, Issue 6, Accepted May 1995.
Danilov et al., "Controlled diffractive optical elements containing a vanadiu, dioxide film", Technical Physics, vol. 44, No. 11, pp. 1345-1350, Nov. 1999.
Chopra et al., "Thin film thermal device applications", Solid Thin Films, vol. 50, pp. 81-98, Section 9, May 1978.
Tian et al., "Component Effects on the Vanadium Oxide Thin Films Phase Transition Character Phenomenon Observed", Laser Physics, vol. 18, No. 10, pp. 1207-1211, Oct. 2008.
Spacht et al., "The design of sealed $CO_2$ lasers continues to improve", Laser Focus World, pp. 105-108, Mar. 2001.
Klank et al., "$CO_2$-laser micromachining and back-end processing for rapid production of PMMA-based microfluidic systems", Lab Chip, vol. 2, pp. 242-246, Sep. 2002.
Degnan, "Optimization of passively Q-switched lasers", IEEE, Quantum Electron, vol. 31, Issue 11, pp. 1890-1901, Nov. 1995.
Kafri et al., "Theory of laser Q-switching by a rotating mirror", Physics Letters A, vol. 33, Issue 1, pp. 5-6, Sep. 1970.
Wood et al., "Passive mode locking of a $CO_2$ laser", Applied Physics Letters, vol. 12, Issue 8, pp. 263-265, Apr. 1968.
Liu et al., "An Infrared Spatial and Frequency Selective Metamaterial Perfect Absorber", Phys. Rev. Letters, vol. 104, Issue 20, May 2010.
Haiml et al., "Optical characterization of semiconductor saturable absorbers", Applied Phys. B, vol. 79, pp. 331-339, Jun. 2004.
Rini et al., "Photoinduced phase transition in VO2 nanocrystals: ultrafast control of surface-plasmon resonance", Optics Letters, vol. 30, No. 5, Mar. 2005.
Nag et al., "Synthesis of vanadium dioxide thin films and nanoparticles", Journal of Physics: Condensed Matter, vol. 20, No. 26, Jun. 2008.
Keller et al., "Semiconductor Saturable Absorber Mirrors. (SESAM's) for Femtosecond to Nanosecond. Pulse Generation in Solid-State Lasers", IEEE Journal of Selected Topics in Quantum Electronics, vol. 20, No. 3, Sep. 1996.
Bowers et al. "Actively mode-locked semiconductor lasers", Quantum Electronics, vol. 25, Issue 6, pp. 1426-1439, Jun. 1989.
Landy et al., "A Perfect metamaterial absorber", Mesoscale and Nanoscale Physics, vol. 100, Issue 20, May 2008.
Tao et al., "A metamaterial absorber for the terahertz regime: design, fabrication and characterization", Optics Express, vol. 16, Issue 10, pp. 7181-7188, May 2008.
Asamitsu et al., "Current switching of resistive states in magnetoresistive manganites", Letters to Nature, pp. 50-52, Jul. 1997.
Miyano et al., "Photoinduced insulator-to-metal transition in a perovskite manganite", Phys. Rev. Letters, vol. 78, No. 22, pp. 4257-4260, Jan. 1997.

* cited by examiner

METAMATERIAL STRUCTURES FOR Q-SWITCHING IN LASERS

CROSS-REFERENCE TO RELATED APPLICATIONS

This Application is the U.S. National Stage filing under 35 U.S.C. §371 of International Application No. PCT/IB2013/053032 filed on Apr. 17, 2013, which claims priority under PCT Article 8 and/or 35 U.S.C. §119(a) to India Application No. 3706/DEL/2012 filed on Dec. 3, 2012. The disclosures of the PCT application and the India patent application are hereby incorporated by reference in their entireties.

BACKGROUND

Unless otherwise indicated herein, the approaches described in this section are not prior art to the claims in this application and are not admitted to be prior art by inclusion in this section.

Laser systems such as carbon dioxide ($CO_2$) laser systems can be used, for example, in micro-machining applications. Such laser systems can include an amplification medium enclosed within a laser cavity having high reflectivity mirrors such that radiation may be confined between the mirrors at certain frequencies. Light may be confined within the cavity and may grow in amplitude due to the amplification medium. The time of light inside the laser cavity may depend on reflectivity of the mirrors and is an estimate of a quality factor (Q-factor) of the cavity.

Short pulses of laser light can be produced by the laser systems using Q-switching techniques. The laser cavity may be in a lossy state until enough population inversion builds in the laser cavity and may be subsequently switched to a non-lossy state such that stimulated emission can then quickly drain the population inversion in a short time to produce short intense laser light pulses.

In some systems, mechanical components such as rotating cavity mirrors can be used to align the laser cavity for short periods of time. The switching time of such systems can be high owing to time required for the laser cavity alignment. In other systems, certain dye molecules can be placed within the laser cavity, where the dye molecules function as Q-switches for facilitating Q-switching in such systems. In certain examples, crystals of electro-optical materials such as cadmium telluride (CdTe) crystals are placed in the laser cavity of the laser systems. The electro-optical materials are anisotropic and can change polarization of light as it passes through the crystals. Such crystals can be utilized to enable switching of the cavity by applying a high voltage pulse through the crystals.

In some other laser systems, one of the cavity mirrors may be coated with saturable absorber materials such as sulfur hexafluoride ($SF_6$), which can make the mirror reflective once the radiation intensity exceeds a certain level.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Techniques described herein are generally related to metamaterial structures for Q-switching in laser systems. The various described techniques may be applied to methods, systems, devices or combinations thereof. Some described metamaterial structures may include a substrate and a first conductive layer disposed on a first surface of the substrate. A dielectric layer may be disposed on a first surface of the first conductive layer and a second conductive layer having a substantially symmetric geometric shape may be disposed on a first surface of the dielectric layer. The second conductive layer may cover at least a portion of the first surface of the dielectric layer.

According to some additional examples of the present disclosure, cavity mirrors for carbon dioxide ($CO_2$) laser systems are described. The cavity mirrors may include a first gold layer disposed on a first surface of a substrate and a vanadium oxide layer disposed on a first surface of the first gold layer. A second gold layer may be disposed on a first surface of the vanadium oxide layer, wherein the second gold layer has a generally disc-shape.

According to still further examples of the present disclosure, methods related to forming a metamaterial structure are described. The methods may include disposing a first conductive layer on a first surface of a substrate. A dielectric layer may be disposed on a first surface of the first conductive layer and a second conductive layer having a substantially symmetric geometric shape may be disposed on the first surface of the dielectric layer. The second conductive layer can cover at least a portion of the first surface of the dielectric layer.

According to still further examples of the present disclosure, methods related to operating a laser system are described. Some example methods may include energizing an amplification medium enclosed within a cavity of the laser system. The laser system can include a metamaterial cavity mirror having first and second conductive layers disposed about a dielectric layer. The metamaterial cavity mirror can be operated in an absorptive mode such that heat generated by absorption of infrared radiation by the metamaterial cavity mirror within the cavity heats the dielectric layer of the metamaterial cavity mirror and switches the operation of the metamaterial cavity mirror from the absorptive mode to a reflective mode of operation to generate a laser pulse.

DETAILED DESCRIPTION

Figure 1:
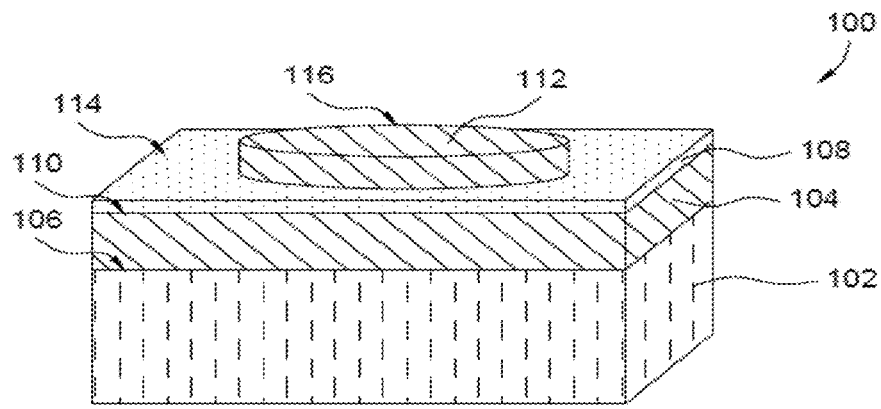
FIG. 1 is a schematic diagram illustrating an example metamaterial structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to absorbent metamaterial structures. The metamaterial structures may include phase changing materials that are effective to enable the metamaterial structures to switch from an absorptive state to a reflective state. In the described embodiments, such metamaterial structures can be used for cavity mirrors in infrared laser systems such as, for example, carbon dioxide ($CO_2$) and carbon monoxide (CO) laser systems. Cavity mirrors formed of these metamaterial structures may be used for Q-switching applications in the laser systems and can be designed for laser emission at infrared frequencies.

FIG. 1 is a schematic diagram illustrating an example metamaterial structure 100 arranged in accordance with at least some embodiments of the present disclosure. The metamaterial structure 100 may include a substrate 102 and a first conductive layer 104 disposed on a first surface 106 of the substrate 102. Example materials for the substrate 102 include, but are not limited to, germanium (Ge), zinc selenide (ZnSe), kapton, silicon (Si), gallium arsenide (GaAs), silicon dioxide ($SiO_2$), calcium fluoride ($CaF_2$), magnesium fluoride ($MgF_2$), sapphire ($Al_2O_3$), or combinations thereof. In some embodiments, the first conductive layer 104 may include a conductive material such as a metal. Example materials for the first conductive layer 104 may include, but are not limited to, gold (Au), copper (Cu), aluminum (Al), silver (Ag), silicon carbide, or combinations thereof. In some examples, the substrate 102 may be a rigid or a flexible substrate having any desired shape. In some examples, the substrate 102 may have a generally concave shape. In this example embodiment, the first conductive layer 104 is illustrated as a continuous layer. In some embodiments, a thickness of the first conductive layer 104 may be about 30 nanometers (nm) to about 300 nm, and ranges between these values.

The metamaterial structure 100 may include a dielectric layer 108 disposed on a first surface 110 of the first conductive layer 104. Example materials for the dielectric layer 108 include, but are not limited to, vanadium oxide ($VO_x$) (Wherein x is about 1.5 to about 2.5), hydrogenated amorphous silicon (a-Si:H), liquid crystals, or combinations thereof. In some example embodiments, the dielectric layer 108 may include vanadium oxide doped with a doping element. Examples of doping elements include, but are not limited to, tungsten (W), argon (Ar), fluorine (F), boron (B), magnesium (Mg), phosphorus (P), ruthenium (Ru), or combinations thereof. In some examples, the dielectric layer 108 may include amorphous titanium oxide (a-$TiO_x$), wherein x is in a range of about 1.2 to about 2.0.

In the illustrated embodiment, the dielectric layer 108 can be configured to undergo a phase change from a dielectric state to a conductive state with a change in temperature. For example, the dielectric layer 108 formed of vanadium dioxide ($VO_2$) may undergo a phase change at a transition temperature of about 341° K. Moreover, transition temperatures of doped vanadium oxides such as tungsten doped vanadium dioxide having a doping of about 2.6% and 1.8% are about 283° K and 315° K respectively. In another example, transition temperatures of doped vanadium oxides such as fluorine doped vanadium dioxide having a doping of about 0.7% and 1.2% are about 333° K and 323° K respectively. In one example, the transition temperature of titanium oxide is about 400° K and the transition temperature of hydrogenated amorphous silicon (a-Si:H) is about 300° K.

In some embodiments, a thickness of the dielectric layer 108 may be about 100 nm to about 200 nm, and ranges between these values. In some examples, a dielectric permittivity of the dielectric layer 108 is greater than about 2.0. In some embodiments, the thickness of the dielectric layer 108 can be selected to control the magnetic resonance frequency and a frequency band of operation of the metamaterial structure 100. For example, for dielectric layer 108 formed of vanadium dioxide ($VO_2$) with a thickness of about 200 nm, the resonance frequency may be about 10.22 μm. In another example, for dielectric layer 108 formed of vanadium dioxide with a thickness of about 170 nm, the resonance frequency may be about 10.24 μm. In another example, for dielectric layer 108 formed of vanadium dioxide with a thickness of about 150 nm, the resonance frequency may be about 10.28 μm.

A second conductive layer 112 may be disposed on a first surface 114 of the dielectric layer 108. As with the first conductive layer 104, the second conductive layer 112 may be formed of a conductive material such as a metal. In some examples, the first conductive layer 104 and the second conductive layer 112 may be formed of doped semiconductor material. Example materials for the second conductive layer 112 may include, but are not limited to, gold (Au), copper (Cu), aluminum (Al), silver (Ag), silicon carbide, or combinations thereof. In some embodiments, the material for the second conductive layer 112 may be selected based on the material used for the first conductive layer 104 and/or the material used for the dielectric layer 108. In some embodiments, a thickness of the second conductive layer 112 may be about 30 nm to about 250 nm, and ranges between any of these values.

In certain embodiments, the second conductive layer 112 can have a substantially symmetric geometric shape. In the illustrated embodiment, the second conductive layer 112 has a generally disc-shape. The disc-shape may correspond to circular, oval, elliptical, among others. However, a variety of other symmetric geometric shapes such as crosses, strips, oval, circular, elliptical, square and rectangular patches, split ring, fish-scale shapes, and fractal shapes may be envisaged for the second conductive layer 112. Moreover, the second conductive layer 112 may cover at least a portion of the first surface 114 of the dielectric layer 108. In some embodiments, the second conductive layer 112 may cover portions of about 10% to about 60% of the first surface 114 of the dielectric layer 108.

In certain embodiments, the metamaterial structure 100 can be configured to switch from an absorptive state to a reflective state at a transition temperature of the dielectric layer 108, as will be described in detail below with reference to FIG. 3. In some examples, such as when the material used for dielectric layer 108 is vanadium dioxide, the transition temperature of the dielectric layer 108 is about 341° K. In other embodiments, the transition temperature of the dielectric layer 108 may be in a range of about 300° K to about 360° K. In some examples, the conductivity of the dielectric layer 108 in the reflective state may be higher by a factor of about $10^3$ to about $10^4$ than its conductivity during the absorptive state. In certain examples, a switching time of the metamaterial structure 100 from the absorptive state to the reflective state is in a range of about 10 nanoseconds (ns) to about 10 milliseconds (ms). For example, the switching time for the metamaterial structure having vanadium oxides as the dielectric layer 108 may be in a range of about 10 as to 300 ns. In some examples, the switching time for the metamaterial structure having liquid crystal as the dielectric layer 108 may be in a range of about 10 ns to about 10 ms. In certain examples, saturation intensities of less than about 140 mW/cm$^2$ are achieved using the metamaterial structure described above.

In some examples, the metamaterial structure 100 may include additional one or more alternating dielectric and conductive layers disposed on a first surface 116 of the second conductive layer 112. In some embodiments, the additional one or more alternating dielectric and conductive layers may have substantially symmetric geometric shape. For example, the additional one or more alternating dielectric and conductive layers may have a generally disc-shape. Other alternative shapes include, but are not limited to, crosses, strips, oval, circular, elliptical, square and rectangular patches, split ring, fish-scale shapes, and fractal shapes.

The metamaterial structure 100 described above may be utilized for cavity mirrors in laser systems such as in pulsed carbon dioxide laser systems. The metamaterial structure described above may be used as a robust Q-switching mirror that may have broadband activity over a large bandwidth of $CO_2$ laser emission, and may be switchable in short time scales of few nanoseconds. In certain embodiments, the switching time may be in a range of about 10 nanoseconds (ns) to about 10 milliseconds (ms). In certain embodiments, a wavelength of the laser emitted from laser systems using cavity mirrors formed of the metamaterial structure described above may be in a range of about 3 microns to about 12 microns. Further, since the metamaterial structure 100 can be formed of robust inorganic materials, it may be operable for millions of cycles involving switching the metamaterial structure from absorptive state to reflective state and vice versa.

Figure 2:
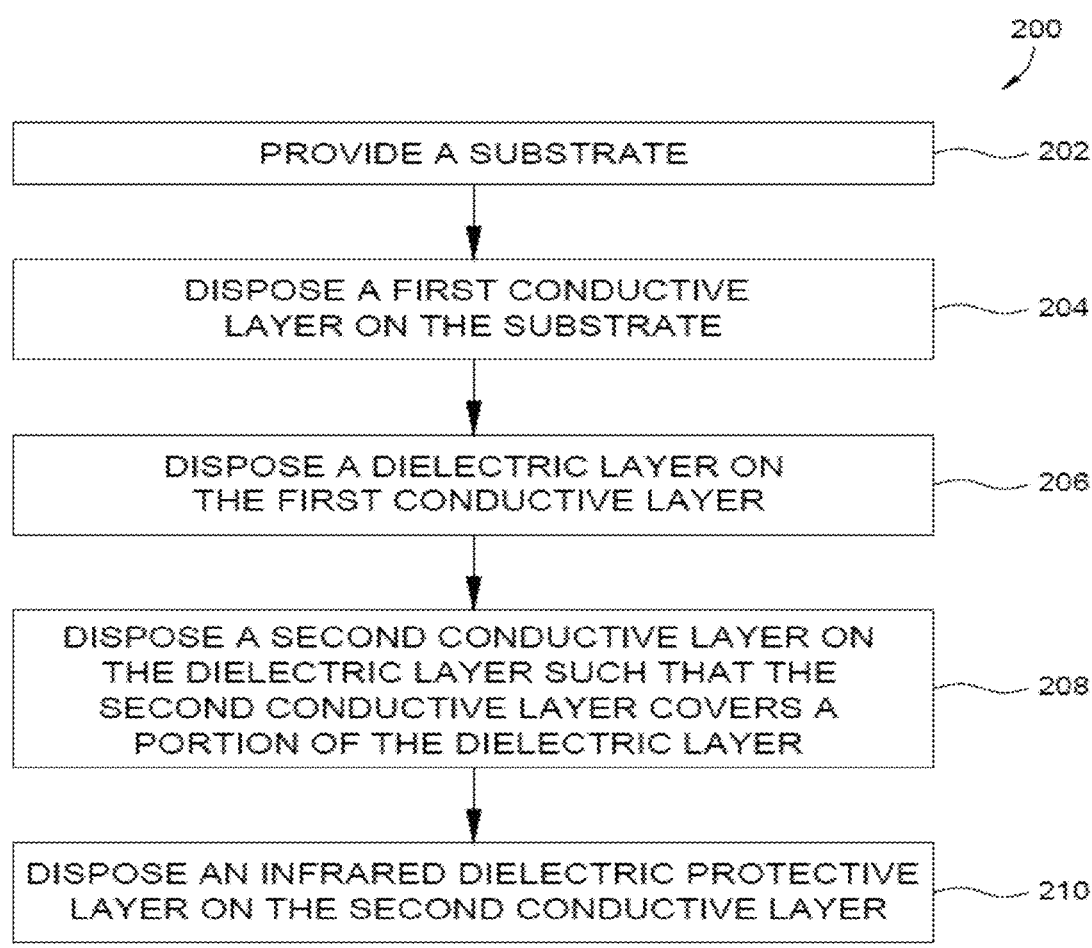
FIG. 2 is an illustration of an example process for forming the metamaterial structure of FIG. 1.

FIG. 2 is an illustration of an example process 200 for forming a metamaterial structure such as the structure 100 of FIG. 1, arranged in accordance with at least some embodiments described herein. Process 200 may include one or more operations, functions or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 200 may begin at block 202.

At block 202, "PROVIDE A SUBSTRATE", a substrate (102) can be provided. Example materials for the substrate (102) include, but are not limited to, germanium (Ge), zinc selenide (ZnSe), kapton, silicon (Si), gallium arsenide (GaAs), silicon dioxide ($SiO_2$), calcium fluoride ($CaF_2$), magnesium fluoride ($MgF_2$), sapphire ($Al_2O_3$), or combinations thereof. In certain embodiments, a solid metal layer such as formed of gold or copper may be used as the substrate (102). In some examples, the substrate (102) may be cooled and maintained at a desired temperature. For example, the substrate (102) may be cooled using water or peltier based cooling.

Process 200 may continue from block 202 to block 204, "DISPOSE A FIRST CONDUCTIVE LAYER ON THE SUBSTRATE." At block 204, a first conductive layer (104) may be disposed on first surface (106) of the substrate (102).

The first conductive layer (104) may be deposited on the first surface (106) of the substrate (102) using conventional deposition techniques such as thermal vapor deposition, sputtering, electron beam evaporation, pulsed laser deposition, reactive deposition techniques, or combinations thereof. Example materials for the first conductive layer (104) include, but are not limited to, gold (Au), copper (Cu), aluminum (Al), silver (Ag), silicon carbide, or combinations thereof. In some embodiments, a thickness of the first conductive layer (104) is in a range of about 30 nanometers (nm) to about 300 nm, and ranges between these values.

Process 200 may continue from block 204 to block 206, "DISPOSE A DIELECTRIC LAYER ON THE FIRST CONDUCTIVE LAYER". At block 206, a dielectric layer (108) may be disposed on a first surface (110) of the first conductive layer (104). The dielectric layer (108) may be deposited on the first surface (110) first conductive layer (104) using conventional deposition techniques such as pulsed excimer laser deposition, sputtering, chemical vapor deposition (CVD) reactive deposition techniques, e-beam evaporation, sol-gel deposition techniques, spray-pyrolysis, or combinations thereof. A layer of vanadium oxide ($VO_x$) (wherein x is in a range of about 1.5 to about 2.5), hydrogenated amorphous silicon (a-Si:H), liquid crystals, or combinations thereof may be deposited on the first conductive layer (104) to form the dielectric layer (108). In one example embodiment, the dielectric layer (108) may include vanadium oxide doped with a doping element. Examples of doping elements include, but are not limited to, tungsten (W), argon (Ar), fluorine (F), boron (B), magnesium (Mg), phosphorus (P), ruthenium (Ru), or combinations thereof. In some examples, the dielectric layer (108) includes amorphous titanium oxide (a-$TiO_x$), wherein x is in a range of about 1.2 to about 2.0. In some embodiments, a thickness of the dielectric layer 108 is in a range of about 100 nm to about 200 nm, and ranges between these values.

Process 200 may continue from block 206 to block 208, "DISPOSE A SECOND CONDUCTIVE LAYER ON THE DIELECTRIC LAYER". At block 208, a second conductive layer (112) having a substantially symmetric geometric shape may be disposed on a first surface (114) of the dielectric layer (108). The second conductive layer (112) can cover a portion of the first surface (114) of the dielectric layer (108). In some embodiments, the second conductive layer (112) may cover about 10% to about 60% of the first surface (114) of the dielectric layer (108), and ranges between or overlapping with these values. In some examples, the second conductive layer (112) may be deposited on the dielectric layer (108) using shadow masking technique. In certain examples, the second conductive layer (112) may be deposited and patterned using lithography techniques such as e-beam lithography, photo lithography, laser interference lithography, or direct laser writing. A layer of conductive material such as gold (Au), copper (Cu), aluminum (Al), silver (Ag), silicon carbide, or combinations thereof may be deposited on the dielectric layer (108) to form the second conductive layer (112).

In some example embodiments, a generally disc-shaped conductive layer can be formed on the dielectric layer (108) to form the second conductive layer (112). However, the second conductive layer (112) may be formed as other symmetrical geometric shapes such as crosses and strips, among others. In some examples, wetting layers such as formed of chromium (Cr), or titanium (Ti) may be used at interfaces of the various layers prior to disposing the next layer.

Process 200 may continue from block 208 to block 210, "DISPOSE AN INFRARED PROTECTIVE LAYER ON THE SECOND CONDUCTIVE LAYER". At block 210, an infrared non-absorbing dielectric protective layer is disposed on a first surface (116) of the second conductive layer (112). The infrared dielectric protective layer may be deposited using conventional deposition techniques such as pulsed excimer laser deposition, sputtering, or combinations thereof. A layer of materials such as calcium fluoride, magnesium fluoride, zinc selenide, zinc sulphide, or combinations thereof may be deposited on the second conductive layer (112) to form the infrared dielectric protective layer.

In some examples, the metamaterial structure may include additional alternating dielectric and conductive layers disposed on the first surface (116) of the second conductive layer (112) to form a multi-band structure. The additional alternating dielectric and conductive layers may be deposited using the techniques described above. The metamaterial structure 100 described above may be utilized for cavity mirrors in laser systems such as in pulsed carbon dioxide laser systems. The metamaterial structure 100 may be effective to facilitate automatic switching of the mirrors from an absorptive state to a reflective state of operation that can be used for Q-switching applications in the laser systems.

Figure 3:
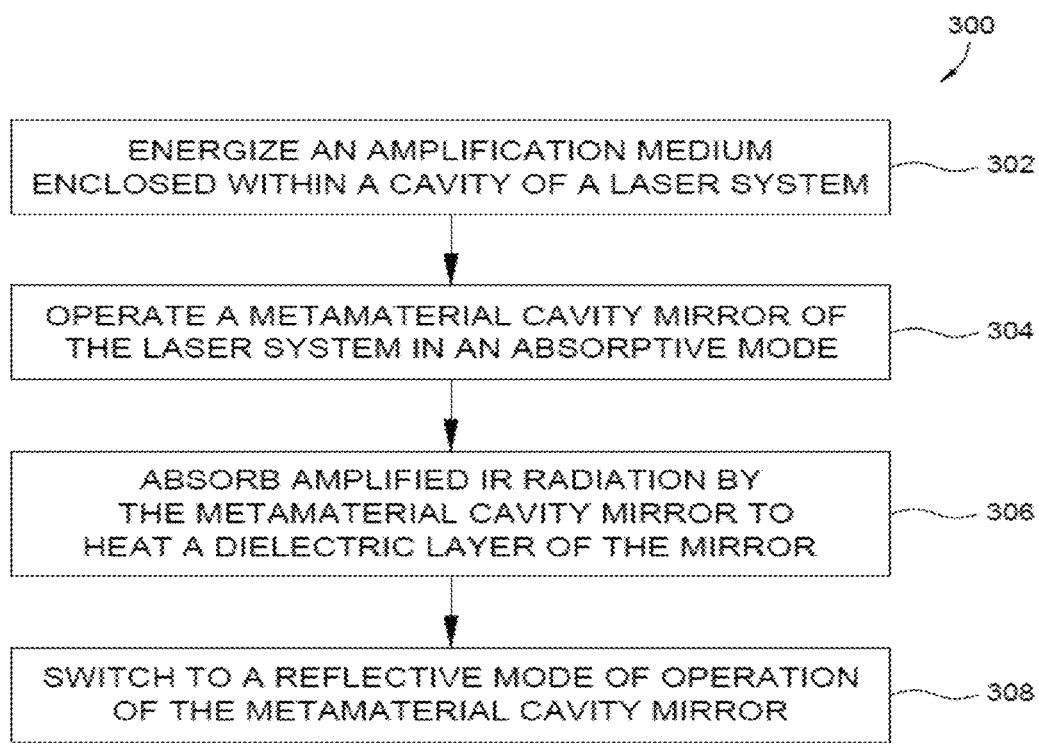
FIG. 3 is an illustration of an example process for operating a laser system with at least one cavity mirror formed of a metamaterial structure of FIG. 1.

FIG. 3 is an illustration of an example process 300 for operating a laser system with at least one cavity mirror formed of a metamaterial structure such as the structure 100 of FIG. 1, arranged in accordance with at least some embodiments described herein. Process 300 may include one or more operations, functions or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 302, "ENERGIZE AN AMPLIFICATION MEDIUM ENCLOSED WITHIN A CAVITY OF A LASER SYSTEM" an amplification medium placed within a cavity of a laser system may be energized. In certain embodiments, a medium formed of carbon dioxide ($CO_2$), carbon monoxide (CO), nitrogen ($N_2$), helium (He), or combinations thereof may be energized. The cavity of the laser system may include a metamaterial cavity mirror (100) having a first conductive layer (104) and a second conductive layer (112) disposed about a dielectric layer (108). In one example, the metamaterial cavity mirror (100) may include a first gold layer disposed on a germanium substrate and a vanadium dioxide layer disposed on the first gold layer. Moreover, the metamaterial cavity mirror (100) may include a disc-shaped second gold layer disposed on the vanadium dioxide layer. In some embodiments, the laser system may be a $CO_2$ laser system and a pulsed electric discharge in the laser system can create population inversion within the cavity of the laser system.

Process 300 may continue from block 302 to block 304, "OPERATE A METAMATERIAL CAVITY MIRROR OF THE LASER SYSTEM IN AN ABSORPTIVE MODE". At block 304, a metamaterial cavity mirror (100) of the laser system may be operated in an absorptive mode. In the absorptive mode, amplified infrared radiation in the cavity may be absorbed by the metamaterial cavity mirror (block 306). Moreover, population inversion may grow within the cavity of the laser system. In this example embodiment, the $VO_2$ layer may function as an insulator at low temperatures, with the metamaterial cavity mirror acting as an absorber.

As the metamaterial cavity mirror (100) may be operated in the absorptive mode, heat generated by absorption of amplified infrared radiation by the metamaterial cavity mirror (100) in the cavity of the laser system may be effective to heat the dielectric layer (108) of the metamaterial cavity mirror.

Process 300 may continue from block 306 to block 308, "SWITCH TO A REFLECTIVE MODE OF OPERATION OF THE METAMATERIAL CAVITY MIRROR". At block 308, as the dielectric layer (108) of the metamaterial cavity mirror is heated, a transition temperature of the dielectric layer (108) may be reached. In certain example embodiments, the transition temperature of the dielectric layer (108) is about 300° K to about 360° K.

Once the transition temperature of the dielectric layer (108) is reached, the dielectric layer (108) becomes conductive and the metamaterial cavity mirror (100) switches from the absorptive mode to a reflective mode of operation. Such switching may result in a substantially high Q-factor of the cavity of the laser system. At this point, the dielectric layer (such as in the case of $VO_2$ used as the dielectric layer) undergoes a Mott phase transition to a metallic or semiconducting phase where its conductivity may increase by about a factor of $10^3$ to about $10^4$. The metamaterial cavity mirror (100) with the dielectric layer (108) in the high temperature metallic phase may behave as a good reflector as the structured second conductive layer (112) and the first conductive layer (104) get shorted and the whole metamaterial structure acts as a conducting surface. As a result, stimulated emission may become dominant in the cavity and energy stored due to population inversion may be drained out by stimulated emission to generate an intense laser pulse lasting for about a 100 nanoseconds. In some embodiments, the pulse duration of the laser pulse may depend upon the materials used for the first and second conductive layers (104 and 112), and thicknesses of the different layers, among other parameters.

Moreover, due to low absorption in the metamaterial cavity mirror (100) at this stage, the temperature of the dielectric layer (108) may reduce. At the reduced temperature, the dielectric layer (108) can change state from metal to dielectric and the metamaterial cavity mirror (100) may become absorptive again and the plasma discharge may terminate. In some embodiments, the process 300 may be cyclic and as the metamaterial cavity mirror (100) becomes absorptive again, process steps 302 through 308 may be repeated in subsequent cycles to generate a series of laser pulses. In some examples, the structure may be cycled through a substantially large number of cycles without affecting the material properties of the structure.

As described above, the metamaterial structure (100) of the cavity mirror can facilitate Q-switching within a cavity of the laser system. A variety of configurations of the metamaterial structure may be envisaged. For example, the metamaterial structure may include a plurality of alternating dielectric and conductive layers disposed on the second conductive layer to form a multi-band structure.

Figure 4:
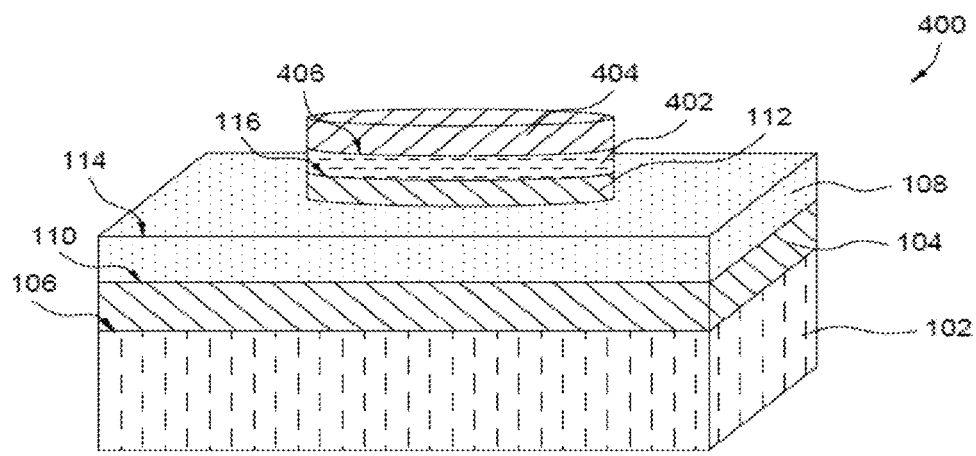
FIG. 4 is a schematic diagram illustrating an example multi-band metamaterial structure.

FIG. 4 is a schematic diagram illustrating an example multi-band metamaterial structure 400 arranged in accordance with at least some embodiments of the present disclosure. As with the metamaterial structure 100 of FIG. 1, the metamaterial structure 400 may include the substrate 102 and the first conductive layer 104 disposed on the first surface 106 of the substrate 102. Example materials for the substrate 102 include, but are not limited to, germanium (Ge), zinc selenide (ZnSe) kapton, silicon (Si), gallium arsenide (GaAs), silicon dioxide ($SiO_2$), calcium fluoride (CaF$_2$), magnesium fluoride (MgF$_2$), sapphire (Al$_2$O$_3$), or combinations thereof. In this example, the first conductive layer 104 of the metamaterial structure 400 includes gold (Au). However, other conductive materials such as copper (Cu), aluminum (Al), silver (Ag), and silicon carbide may be utilized for the first conductive layer 104. In some examples, the first conductive layer 104 and the second conductive layer 112 may be formed of doped semiconductor material. In some embodiments, a thickness of the first conductive layer 104 is about 30 nanometers (nm) to about 300 nm, and ranges between these values.

Moreover, the metamaterial structure 400 may include the dielectric layer 108 disposed on the first surface 110 of the first conductive layer 104. In this example embodiment, the dielectric layer 108 may include vanadium dioxide. However other materials such as hydrogenated amorphous silicon (a-Si:H), liquid crystals, doped vanadium oxide, amorphous titanium oxide (a-TiO$_x$ with x in a range of about 1.2 to about 2.0), or combinations thereof may be utilized for the dielectric layer 108. In some embodiments, a thickness of the dielectric layer 108 is about 100 nm to about 200 nm, and ranges between these values. The metamaterial structure 400 may include the disc-shaped second conductive layer 112 disposed on the first surface 114 of the dielectric layer 108. Other alternative shapes for the second conductive layer 112 include, but are not limited to, crosses, strips, oval, circular, elliptical, square and rectangular patches, electric split ring resonators, fish-scale shapes, and fractal shapes. Example materials for the second conductive layer 112 include, but are not limited to, gold (Au), copper (Cu), aluminum (Al), silver (Ag), silicon carbide, or combinations thereof. In some embodiments, a thickness of the second conductive layer 112 is about 30 nm to about 250 nm, and ranges between these values.

The metamaterial structure 400 may also include a second dielectric layer 402 disposed on the first surface 116 of the second conductive layer 112. Moreover, a third conductive layer 404 may be disposed on a first surface 406 of the second conductive layer 112. In this example, the second dielectric layer 402 may be formed of vanadium dioxide (VO$_2$). Other suitable dielectric materials may be used. The material for the third conductive layer 404 may be selected based on the materials used for the first conductive layer 104 and the second conductive layer 112. In this example embodiment, the third conductive layer 404 may be formed of gold.

In this embodiment, the second dielectric layer 402 and the third conductive layer 404 are generally disc-shaped. However, other geometrically symmetric shapes may be formed. In this example, one additional dielectric layer 402 and the conductive layer 404 are disposed on the second conductive layer 112 to form the multi-band metamaterial structure 400. In certain example configurations, greater number of alternating layers of dielectric and conductive materials may be stacked on the second conductive layer 112 to form the metamaterial structure. The multi-band metamaterial structures using the materials described above may be polarization independent and can be used over multiple bands of infrared wavelengths ranging from about 3 μm to about 10 μm, and ranges between these values. For example, the metamaterial structures may be used for infrared wavelengths ranging from about 3 μm to about 4 μm, about 4 μm to about 5 μm, about 5 μm to about 6 μm, about 6 μm to about 7 μm, about 7 μm to about 8 μm, about 8 μm to about 9 μm, about 9 μm to about 10 μm and ranges between these values. In certain embodiments, dual band mirror formed of the structure described above may be used for different laser wavelengths such as at about 10 microns for CO$_2$ laser systems and at about 5 microns for CO laser systems.

The example methods and systems described above provide metamaterial structures for use in cavity mirrors of laser systems such as CO$_2$ laser systems. The passive saturable absorbing mirror formed using the metamaterial structures described above may be used as an integrated device with low saturation intensities and can eliminate separate components such as the cavity mirror and the Q-switch used in conventional laser systems. The metamaterial structures described above may facilitate rapid Q-switching of the cavity of such laser systems.

The metamaterial structures may be formed of conductive materials such as gold along with dielectric material like vanadium dioxide that may act as a phase change material for switching the metamaterial structure from an absorptive state to a reflective state as levels of radiation increase within the cavity of the laser system. Such structures facilitate switching from the absorptive state to the reflective state without requiring an external heat source. The wavelength of operation of the laser systems and threshold levels for switching can be chosen by customizing the design of the metamaterial structures and such metamaterial structures can be formed by standard micro-fabrication processes. For example, size and shapes of the various layers used in the metamaterial structures described above may be selected to achieve desired levels of wavelength of operation.

The bandwidth of the metamaterial structures of almost 500 nm with absorbance greater than about 90% in the absorptive state and reflectivity greater than about 95% in the reflective state may facilitate use of the metamaterial structure over a large bandwidth of laser transitions for laser systems. The metamaterial structures described provide substantially high speed of switching at mid infrared frequencies. Such metamaterial structures may also be useful for mode-locking applications and producing sub-nanosecond pulses from CO$_2$ lasers.

Moreover, the metamaterial structures described above may be utilized as a switch at terahertz frequencies in the range of about 1 THz to about 10 THz. The metamaterial cavity mirror such as described above can be switched on or off for the terahertz radiation with frequencies in the range of about 1 THz to about 10 THz by using laser pulses at another frequency to heat the device such as in CO$_2$, near infrared (NIR) or visible laser systems.

Additional illustrated embodiments will be described below in further detail with examples and comparative examples thereof, but it is noted that the present disclosure is by no means intended to be limited to these examples.

An example metamaterial absorber with a plurality of unit cells having the structure of FIG. 1 was formed. In this example, the substrate (102) was formed of germanium (Ge) and the first and second conductive layers (104 and 112) were formed of gold (Au). Further, the dielectric layer (108) was formed of vanadium dioxide (VO$_2$). The diameter of the gold disc used as the second conductive layer (112) was about 2 microns and the thickness of the gold disc (112) was about 100 nm. The thickness of the first gold layer (104) and the dielectric layer (108) were about 200 nm to obtain a high absorption band at about 10.22 microns.

Figure 5:
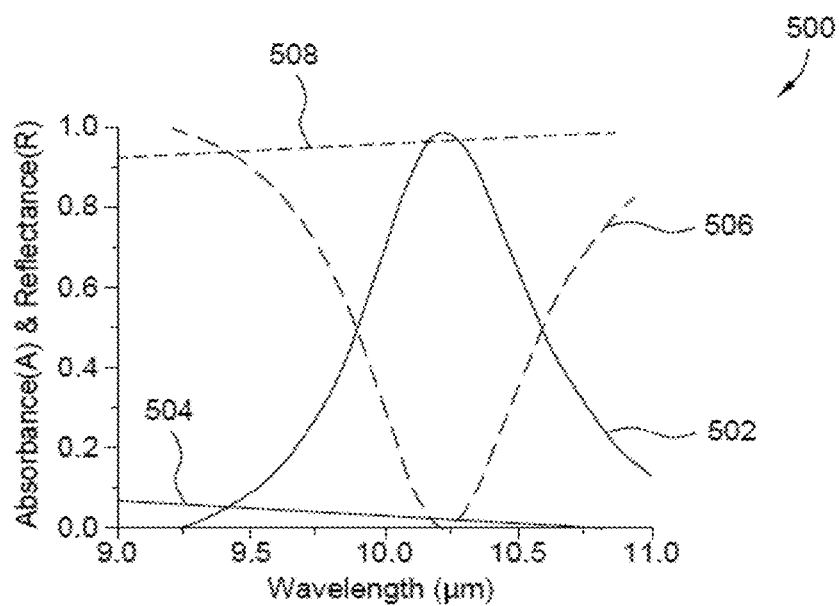
FIG. 5 illustrates example absorbance and reflectivity profiles of a metamaterial structure.

FIG. 5 illustrates example absorbance and reflectivity profiles 500 of the metamaterial structure of FIG. 1, arranged in accordance with at least some aspects described herein. Electromagnetic estimations were done by simulations using finite element techniques with commercially available COMSOL software. Experimental values of dielectric properties and conductivities relevant for the infrared frequency for the materials were used for the estimation. The estimated absorbance of the metamaterial structure in the absorptive state when the VO$_2$ layer is in a low temperature insulating phase and a high temperature metallic phase are represented by reference numerals 502 and 504 respectively. Moreover, an estimated reflectance of the metamaterial structure in the absorptive state when the VO$_2$ layer is in a low temperature insulating phase and a high temperature metallic phase are represented by reference numerals 506 and 508 respectively.

As can be seen, at the beginning of operation, when radiation is switched on, the metamaterial structure is in the absorptive state with absorbance of greater than about 99% at 10.22 µm with a full width at half maxima (FWHM) of about 500 nm. The absorbed radiation heated the metamaterial structure beyond the metal-insulator transition temperature of the VO$_2$ layer that switched an initially absorptive metamaterial structure to reflective. A substantial amount of radiation falling on the metamaterial structure is now reflected with a reflectance of the metamaterial structure that is greater than about 95% at wavelengths of about 9 µm to about 11 µm.

Figure 6:
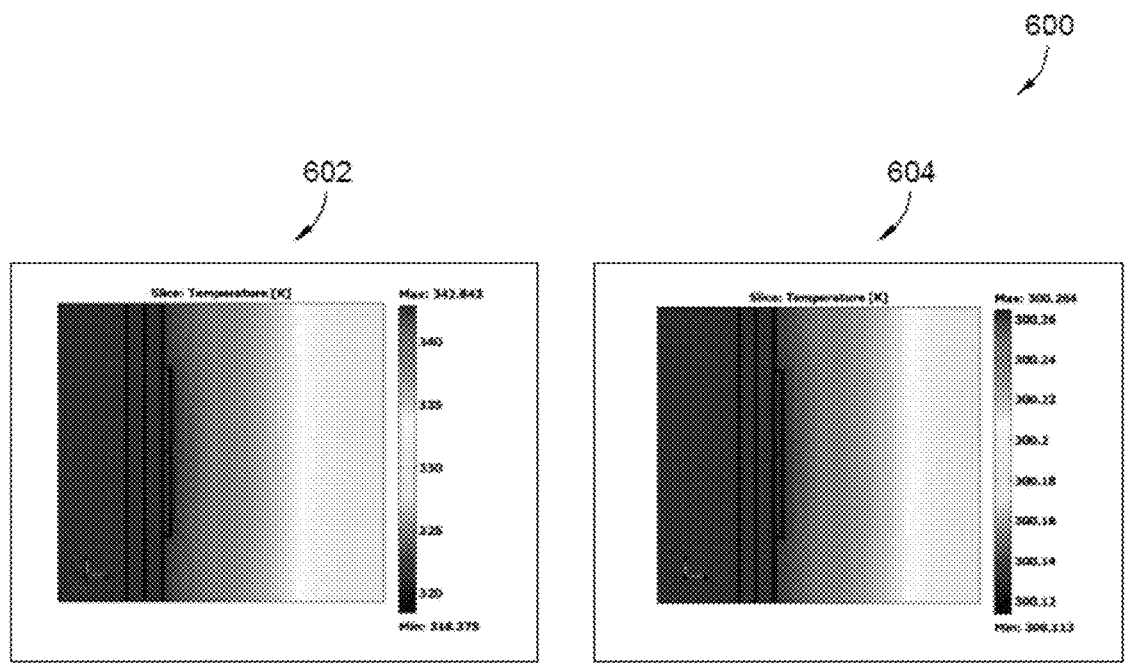
FIG. 6 illustrates example temperature distribution profiles of a metamaterial structure, all arranged in accordance with at least some embodiments of the present disclosure.

FIG. 6 illustrates example temperature distribution profiles 600 of the metamaterial structure of FIG. 1, arranged in accordance with at least some examples described herein. The temperature distribution in the VO$_2$ layer of the metamaterial structure was estimated using inhomogeneous heat absorption in the metamaterial as the heat input. Here, standard values of conductivity for the various materials measured in experiments were used to obtain the temperature distribution profiles 600. An ambient temperature of about 300° K was assumed for initial and boundary conditions. The temperature was observed to be essentially uniform across the metamaterial layer, it should be noted that the continuous gold layer (first conductive layer 104) with substantially high conductivity at the bottom of the metamaterial structure enabled this observed homogeneous temperature distribution.

The temperature distribution for the absorbing metamaterial structure with the VO$_2$ layer in an insulating phase is represented by reference numeral 602. The temperature of the VO$_2$ layer was measured to be about 342° K, Which was greater than a critical temperature for phase transition of VO$_2$. The temperature distribution for the metamaterial in a reflecting state of operation with the VO$_2$ layer in a conducting phase is represented by reference numeral 604. The steady state temperature in the VO$_2$ layer had reduced to almost ambient levels in absence of the absorption that implied switching of the metamaterial structure back to the absorptive state of operation.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"): the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A metamaterial structure, comprising:
    a substrate;
    a first conductive layer disposed on a first surface of the substrate, wherein the substrate includes one of a rigid substrate with a concave shape or a flexible substrate with a concave shape;
    a dielectric layer disposed on a first surface of the first conductive layer, wherein the dielectric layer is configured to undergo a phase change with a change in temperature, wherein the phase change is from an absorptive state to a reflective state at a transition temperature of the dielectric layer in response to heat generated by absorption of infrared radiation by the metamaterial structure;
    a second conductive layer disposed on a first surface of the dielectric layer, wherein the second conductive layer covers at least a portion of the first surface of the dielectric layer, and wherein the second conductive layer has a generally disc-shape; and
    a dielectric protective layer disposed on a first surface of the second conductive layer, wherein the dielectric protective layer is effective to absorb radiation except in an infrared spectrum.

2. The metamaterial structure of claim 1, wherein the substrate comprises a flexible substrate.

3. The metamaterial structure of claim 1, wherein the substrate includes one or more of germanium (Ge), zinc selenide (ZnSe), kapton, silicon (Si), gallium arsenide (GaAs), silicon dioxide ($SiO_2$), calcium fluoride ($CaF_2$), magnesium fluoride ($MgF_2$), and sapphire ($Al_2O_3$).

4. The metamaterial structure of claim 1, wherein the first conductive layer includes one or more of gold (Au), copper (Cu), aluminum (Al), silver (Ag), and silicon carbide.

5. The metamaterial structure of claim 1, wherein the dielectric layer includes vanadium oxide doped with a dopant element.

6. The metamaterial structure of claim 5, wherein the dopant element includes one or more of tungsten (W), argon (Ar), fluorine (F), boron (B), magnesium (Mg), phosphorus (P), and ruthenium (Ru).

7. The metamaterial structure of claim 1, wherein the dielectric layer includes one or more of hydrogenated amorphous silicon (a-Si:H) and liquid crystals.

8. The metamaterial structure of claim 1, wherein the second conductive layer includes one or more of gold (Au), copper (Cu), aluminum (Al), silver (Ag), and silicon carbide.

9. The metamaterial structure of claim 1, wherein the second conductive layer is formed as a generally disc-shaped structure.

10. The metamaterial structure of claim 1, wherein the transition temperature of the dielectric layer is in a range of about 300° K to about 360° K.

11. The metamaterial structure of claim 1, wherein a switch time of the dielectric layer from the absorptive state to the reflective state is in a range of about 10 nanoseconds (ns) to about 10 milliseconds (ms).

12. The metamaterial structure of claim 1, further comprising:
    one or more alternating dielectric and conductive layers disposed on the first surface of the second conductive layer, wherein the one or more alternating dielectric and conductive layers are formed as one of having a substantially symmetric, geometric shape or as generally disc-shaped structures.

13. A cavity mirror for a carbon dioxide ($CO_2$) laser system, the cavity mirror comprising:
    metamaterial structures wherein:
        at least some of the metamaterial structures includes:
            a first gold layer disposed on a first surface of a substrate, wherein the substrate includes one of a rigid substrate with a concave shape or a flexible substrate with a concave shape;
            a vanadium oxide layer disposed on a first surface of the first gold layer, wherein the vanadium oxide layer includes vanadium oxide doped with a dopant element and wherein the dopant element includes one or more of: argon (Ar), boron (B), magnesium (Mg), phosphorus (P), and ruthenium (Ru);
            a second gold layer disposed on a first surface of the vanadium oxide layer, wherein the second gold layer has a generally disc-shape, and wherein the cavity mirror is operable in an absorptive state such that heat generated by absorption of infrared radiation by the cavity mirror is effective to heat the vanadium oxide layer and to switch the metamaterial structures from the absorptive state to a reflective state of operation at a transition temperature of the vanadium oxide layer to generate a laser pulse; and
            a dielectric protective layer disposed on a first surface of the second gold layer, wherein the dielectric protective layer is effective to absorb radiation except in an infrared spectrum.

14. The cavity mirror of claim 13, wherein the substrate includes one or more of germanium (Ge), zinc selenide (ZnSe), kapton, silicon (Si), gallium arsenide (GaAs), silicon dioxide ($SiO_2$), calcium fluoride ($CaF_2$), magnesium fluoride ($MgF_2$), and sapphire ($Al_2O_3$).

15. The cavity mirror of claim 13, wherein the transition temperature of the vanadium oxide layer is in a range of about 300° K to about 360° K.

16. The cavity mirror of claim 13, wherein a reflectivity of the cavity mirror in the reflective state is greater than about 95%.

\* \* \* \* \*

UNITED STATES PATENT AND TRADEMARK OFFICE
CERTIFICATE OF CORRECTION

PATENT NO. : 9,627,840 B2  Page 1 of 1
APPLICATION NO. : 14/131899
DATED : April 18, 2017
INVENTOR(S) : Anantha et al.

It is certified that error appears in the above-identified patent and that said Letters Patent is hereby corrected as shown below:

In the Specification

In Column 1, Line 8, delete "§371" and insert -- § 371 --, therefor.

In Column 1, Line 10, delete "§119(a)" and insert -- § 119(a) --, therefor.

In Column 5, Line 4, delete "10 as" and insert -- 10 ns --, therefor.

In Column 5, Line 7, delete "10ns" and insert -- 10μs --, therefor.

In Column 5, Line 67, delete "on first" and insert -- on a first --, therefor.

In Column 8, Line 66, delete "(ZnSe)" and insert -- (ZnSe), --, therefor.

In Column 11, Line 34, delete "layer, it" and insert -- layer. It --, therefor.

In Column 11, Line 42, delete "Which" and insert -- which --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*